United States Patent [19]
Haraguchi

[11] Patent Number: 6,021,956
[45] Date of Patent: Feb. 8, 2000

[54] THERMAL IMAGE JUDGING METHOD AND AIR CONDITIONER CONTROL METHOD

[75] Inventor: Tatsuo Haraguchi, Saitama-Ken, Japan

[73] Assignee: Zexel Corporation, Tokyo, Japan

[21] Appl. No.: 08/969,452

[22] Filed: Nov. 13, 1997

[30] Foreign Application Priority Data

Dec. 4, 1996 [JP] Japan ................................. 8-324393

[51] Int. Cl.⁷ .................................................. B60R 16/02
[52] U.S. Cl. ......................... 236/51; 236/49.3; 340/588
[58] Field of Search ........................ 236/49.3, 51, 91 E, 236/91 C; 62/129, 130; 165/202, 203, 204, 237; 454/229, 239, 256; 340/565, 567, 584, 585, 588, 589

[56] References Cited

U.S. PATENT DOCUMENTS

| | | | |
|---|---|---|---|
| 5,187,943 | 2/1993 | Taniguchi et al. | 236/49.3 X |
| 5,326,028 | 7/1994 | Kano et al. | 236/51 X |
| 5,331,825 | 7/1994 | Kim | 236/51 X |
| 5,634,846 | 6/1997 | Lee et al. | 340/567 X |

Primary Examiner—Harry B. Tanner
Attorney, Agent, or Firm—Kanesaka & Takeuchi

[57] ABSTRACT

Whether a thermal image is in a steady state or an unsteady state is judged based on measurement values of temperatures of objects and ambient temperature and previously obtained relational expressions between ambient temperature and the temperatures of the objects and an air conditioner is controlled based on the result of the judgment.

6 Claims, 4 Drawing Sheets

(AT THE TIME OF HEATING OPERATION)

THERMAL IMAGE JUDGING METHOD AND AIR CONDITIONER CONTROL METHOD

BACKGROUND OF THE INVENTION

1. Field of the Invention

This invention relates to a method of judging a thermal image measured by infrared sensors and a method of controlling an air conditioner. More specifically, it relates to a method of judging whether a thermal image is in a steady state or an unsteady state in transit to a steady state and a method of controlling an air conditioner based on the result of the above judgment.

2. Description of the Prior Art

Heretofore, the temperature and blow-off direction of air from an air outlet port of an air conditioner for a vehicle have been controlled by a driver's operation of switches for setting temperature and the like installed near the dashboard of a driver's seat. However, when a driver gets into a vehicle and sets a temperature in the air conditioner, for example, setting a cooling mode in the air conditioner for a vehicle in summer, the temperature inside the vehicle (to be referred to as "ambient temperature" hereinafter) quickly falls and then becomes stable at a predetermined low point. Even when this ambient temperature becomes stable, it takes some time to achieve a steady state in which changes in the temperatures of the skin and clothes of the driver become small. This is because a fall in the skin temperature of the driver is slower than a fall in ambient temperature. The driver may not feel refreshed even when the ambient temperature reaches a set temperature. Further, since the seats are warmed by the heat of the outside air and the heat of solar radiation, the body of the driver is difficult to be cooled, thereby causing imbalance between the refreshing feelings of different parts of the body of the driver. Thus, the air conditioner of the prior art merely controls temperature such that the ambient temperature becomes equal to the set temperature without taking into account the condition of a person in the vehicle. Therefore, the time during which the inside of the vehicle is in an unsteady state is long. In addition, when the angle of the air outlet port of the air conditioner is not appropriate and the air outlet port faces downward, for example, the driver feels uncomfortable because only his/her feet are cooled. Also in this case, it can be said that the inside of the vehicle is in an unsteady state. Therefore, to bring the inside of the vehicle into a comfortable steady state, the driver must operate the switch of the air conditioner frequently in the prior art.

As a method of estimating whether the inside of the vehicle is in a steady state or not, there is a technique which comprises detecting temperature changes in a plurality of portions of the skin or clothes of a driver and judging that each of the portions becomes a steady state when a change in the temperature data of each of the portions becomes smaller than a predetermined value. However, in this technique, it is necessary to record temperature data D(t) on each portion at intervals of a certain time (time intervals Δt) and compare temperature data D(t-Δt) with temperature data D(t) all the times. Since a change in the average Dm of temperature data D(t) for each time interval must be obtained to make the value of the change very accurate, the measurement takes time. Therefore, the air conditioner cannot be controlled quickly. In addition, as data for each time interval is recorded and calculated in the above technique, a control unit needs a large number of memories and calculation operation becomes complicated because of a huge number of data to be processed.

The inventor of the present invention has proposed a temperature distribution measuring unit for measuring a temperature distribution in a driver by detecting infrared rays from the driver or seats in the vehicle with incident light temperature sensors (to be referred to as "infrared sensors" hereinafter) in Japanese Laid-open Patent Application No. Hei 8-101671. This unit detects infrared rays radiated from the driver and the like in the vehicle, calculates temperature data based on the outputs of infrared sensors provided for the measuring unit and measures a temperature distribution in the vehicle. This temperature distribution measuring unit is installed on top of the dashboard or therearound, room mirror, room lamp, pillar or the like to detect a required area in the vehicle so that a temperature distribution mainly in an upper part including the thigh and portions therearound of the body of a driver can be measured. FIG. 6 shows an example of the temperature distribution measuring unit 1 which is installed on a portion near the top of a dashboard 5 almost in front of a person 4 seated on a driver's seat 3 inside a vehicle 2. FIG. 7 shows an example of a thermal image of the inside of the vehicle obtained by this temperature distribution measuring unit 1. The temperatures of the face of the driver, the seat and the like and the existence of the temperature difference between right and left portions of the image can be judged and the existence and direction of solar radiation can be estimated from this thermal image.

Although the existence and direction of solar radiation can be estimated through the pattern recognition of the formed thermal image in the above invention, it is difficult to judge whether the inside of the vehicle at the time of cooling or heating operation of the air conditioner is in a thermally balanced steady state or an unbalanced unsteady state in transit to a steady state and to reflect the result of the judgment on the control of the air conditioner.

SUMMARY OF THE INVENTION

In view of the above problems of the prior art, it is an object of the present invention to provide a method of quickly judging whether the inside of a vehicle is in a steady state or an unsteady state using a thermal image measured by infrared sensors and a method of controlling an air conditioner to air-condition the inside of the vehicle in a comfortable manner.

According to a first aspect of the present invention, there is provided a method of judging whether a thermal image measured by infrared sensors is in a steady state or an unsteady state based on the measurement values of the temperatures of objects and ambient temperature and previously obtained relational expressions between ambient temperature and the temperatures of the objects.

According to a second aspect of the present invention, there is provided a method of judging a thermal image, wherein the objects to be measured are each divided into a plurality of regions and whether a thermal image is in a steady state or an unsteady state is judged based on the measurement values of the temperatures of the divided objects and ambient temperature and previously obtained relational expressions between ambient temperature and the temperatures of the objects.

According to a third aspect of the present invention, there is provided a method of judging a thermal image, wherein an unsteady state is determined when the difference between the measurement temperature of an object and the temperature of the object obtained by inserting an ambient temperature at the time of measurement into the relational expression exceeds a predetermined value.

According to a fourth aspect of the present invention, there is provided a method of judging a thermal image, wherein an unsteady state is determined when the difference between the ratio of the measurement temperatures of objects and the ratio of the temperatures of the objects obtained by inserting an ambient temperature at the time of measurement into the relational expressions exceeds a predetermined value.

According to a fifth aspect of the present invention, there is provided a method of judging a thermal image, wherein an unsteady state is determined when the difference between ambient temperatures obtained by inserting the measurement temperatures of objects into the relational expressions exceeds a predetermined value.

According to a sixth aspect of the present invention, there is provided a method of controlling an air conditioner characterized in that objects to be measured of a thermal image measured by infrared sensors are each divided into a plurality of regions, and using the measurement values of the temperatures of the divided objects and ambient temperature and previously obtained relational expressions between ambient temperature and the temperatures of the objects, it is judged that the thermal image is not in a steady state with small variations in the temperatures of the objects but in an unsteady state in transit to a steady state when the difference between the measurement temperature of an object and the temperature of the object obtained by inserting an ambient temperature at the time of measurement into the above relational expression exceeds a predetermined value, or when the difference between the ratio of the measurement temperatures of objects and the ratio of the temperatures of the objects obtained by inserting an ambient temperature at the time of measurement into the above relational expressions exceeds a predetermined value, or when the difference between ambient temperatures obtained by inserting the measurement temperatures of objects into the above relational expressions exceeds a predetermined value.

The above and other objectives, features and advantages of the present invention will become more apparent from the following description when taken in conjunction with the accompanying drawings.

DETAILED DESCRIPTION OF THE PREFERRED EMBODIMENTS

Preferred embodiments of the present invention are described hereinunder with reference to the accompanying drawings.

In the following description, the same or corresponding elements as in the prior art are given the same reference symbols and their descriptions are omitted.

Embodiment 1

Figure 1:
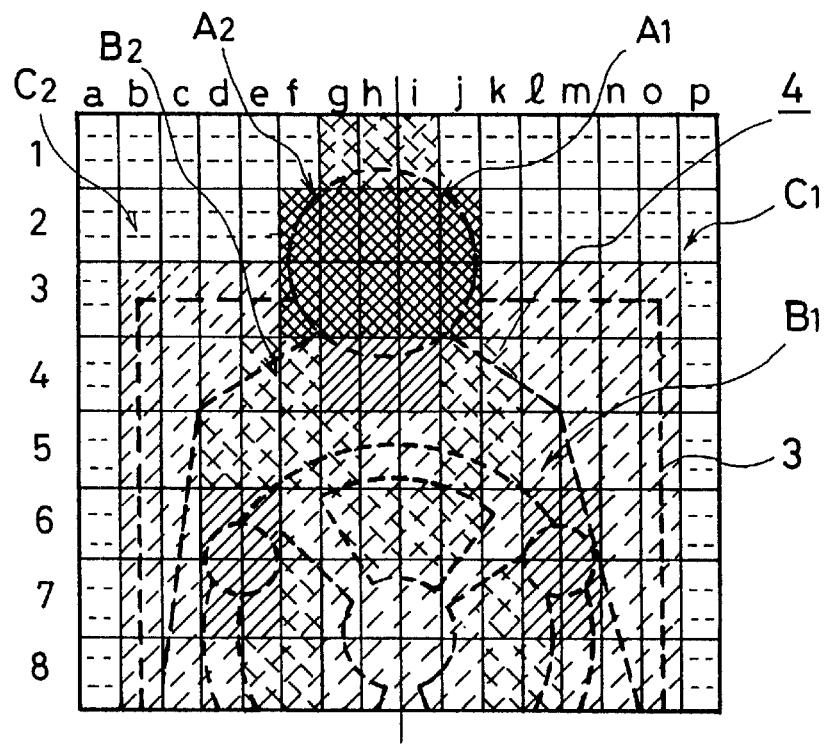
FIG. 1 is a diagram showing a thermal image according to an embodiment of the present invention.

FIG. 1 shows an example of a thermal image obtained by a temperature distribution measuring unit 1. This temperature distribution measuring unit 1 comprises infrared sensors which are disposed in a matrix form inside a rotating cylinder having a slit to detect infrared rays radiated from a driver and the like in a vehicle and calculates temperature data based on the outputs of the above infrared sensors which are matrix elements to measure a temperature distribution in the vehicle. The rotating slit has a chopper function to transmit or shut off incident light. This thermal image is formed based on temperature data calculated from the outputs of the infrared sensors arranged in a matrix form and consists of 128 matrix elements in 8 rows×16 columns. In FIG. 1, for simplicity, the matrix elements of the above thermal image are shown in five different color gradations (2.5° intervals) according to display temperature width.

The thermal image shows a temperature distribution in the vehicle when the air conditioner is controlled properly and the inside of the vehicle reaches a steady state. As shown in FIG. 1, there are no temperature differences between right and left parts (A1 and A2) of the head, right and left parts (B1 and B2) of the clothes of a driver 4 and right and left parts (C1 and C2) of the background including the seat and the average temperature of each part is normal.

Figure 2:
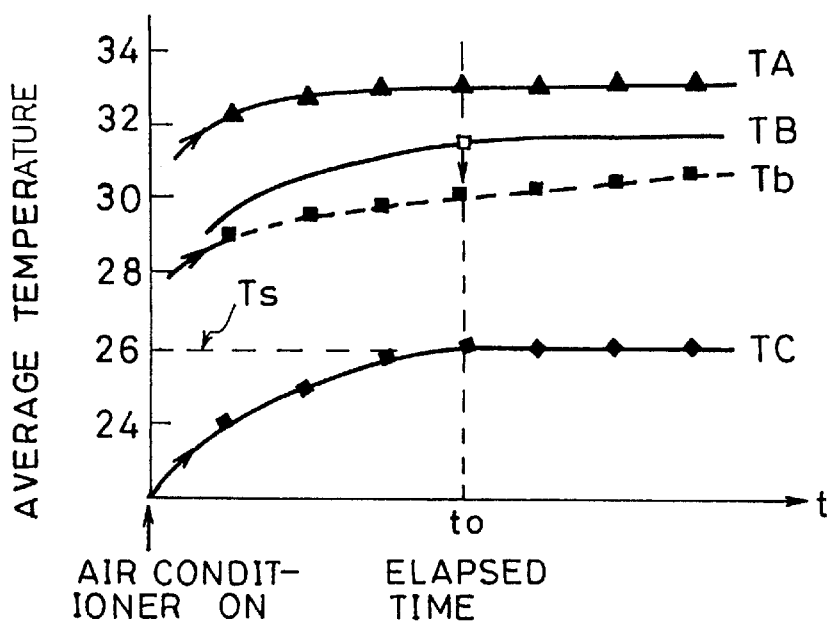
FIG. 2 shows an example of a temperature change in each object inside of a vehicle before start of heating operation.

Generally, when a driver gets into a vehicle and sets a heating mode in the air conditioner, the temperature inside the vehicle (to be referred to as "ambient temperature" hereinafter) rises quickly but a rise in the skin temperature of the driver is slow. FIG. 2 shows the average temperature TA of the skin region and the average temperature TB of the clothes region of the driver, the ambient temperature TC and the time elapsed from the time when the driver turns on the air conditioner for heating. Even when the ambient temperature TC reaches the set temperature TS, the average temperature TA of the skin region and the average temperature TB of the clothes region of the driver are still rising slowly. In this case, as values of the average temperature TA of the skin region and the average temperature TB of the clothes region are not so low and their changes are small, it is not necessary to change the control state of the air conditioner. However, when the air outlet port of the air conditioner faces upward more than required or the sheet is too cold, the clothes of the driver are not warmed quickly and the temperature of the clothes region does not rise quickly as shown by a broken line Tb in FIG. 2.

Figure 3:
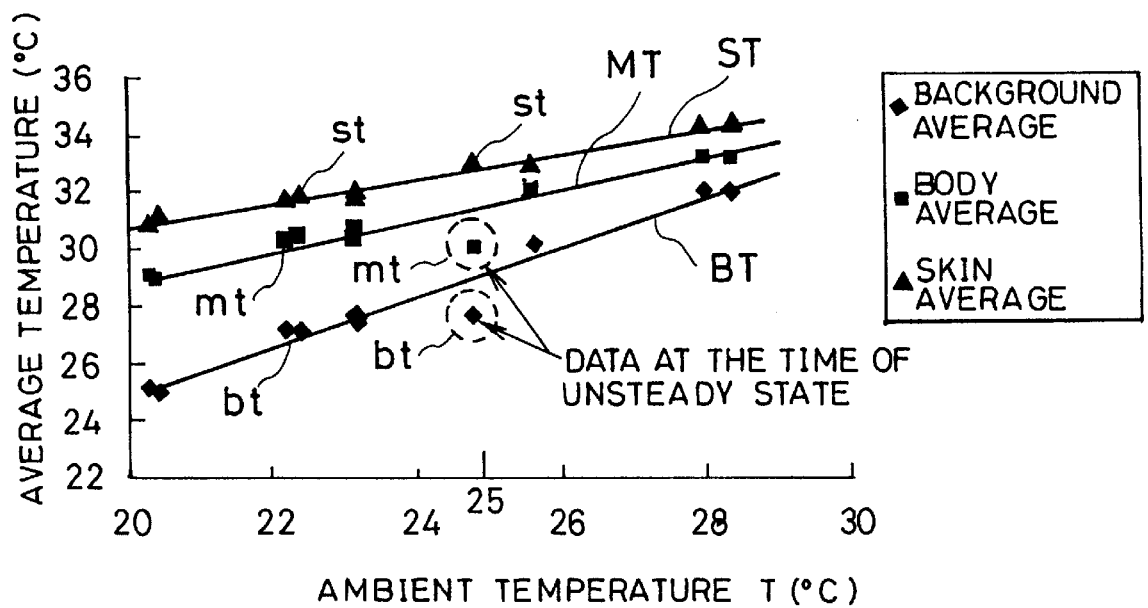
FIG. 3 is a diagram showing the relationship between ambient temperature and the temperature of each object of a thermal image according to an embodiment of the present invention.

Experiments were conducted by putting summer and winter typical clothes on a thermal mannequin and changing the temperature in the vehicle to a desired point to form a thermal image of the thermal mannequin. According to the result of the experiments, it was found that, in a thermal image obtained by the temperature distribution measuring unit 1, there are primary relationships between the ambient temperature and the average temperature of the skin region, the average temperature of human body and the average temperature of the background as shown in FIG. 3. That is, in a steady state, when the ambient temperature is represented by T, the average value of the background temperature by BT, the average value of the body temperature by MT and the average value of the skin temperature by ST, the above primary relationships can be expressed by the following equations.

$$BT = 0.80 \cdot T + 8.7 \quad (1)$$

$$MT = 0.53 \cdot T + 17.8 \quad (2)$$

$$ST = 0.47 \cdot T + 21.2 \quad (3)$$

BT is referred to as "reference background average", MT "reference body average" and ST "reference skin average".

By comparing the average value "bt" of the background temperature (background average), the average value "mt" of the body temperature (body average) and the average value "st" of the skin temperature (skin average) actually measured by the temperature distribution measuring unit 1 with the above relational expressions (1), (2) and (3), respectively, it can be judged whether the inside of the vehicle is in a steady state or an unsteady state. For example, as shown in FIG. 3, when T=25°, the value of the skin average "st" is normal but the values of the background average "bt" and the body average "mt" do not satisfy the above relational expressions. Therefore, it is estimated that the inside of the vehicle is in an unsteady state and hot air from the air outlet port is blown against a portion near the face of the driver.

Thus, in this embodiment of the present invention, since whether the current thermal image is in a steady state or an unsteady state is judged based on the average value of the background temperature, the average value of the body temperature, the average value of the skin temperature, and the previously obtained relational expressions between the ambient temperature and the reference background average, reference body average and reference skin average, it is possible to judge the state of the inside of the vehicle with a single measurement of a thermal image without calculating time averages of temperature data. Therefore, the air conditioner can be controlled quickly.

Embodiment 2

A thermal image at the time of heating operation obtained by the temperature distribution measuring unit 1 is divided into 6 regions: right and left parts (A1 and A2) of the head, right and left parts (B1 and B2) of the clothes of the driver 4, and right and left parts (C1 and C2) of the background including the seat. The average temperature b1 of the region C1 (left part of the background), the average temperature b2 of the region C2 (right part of the background), the average temperature m1 of the region A1 and the region B1 (left part of the body), the average temperature m2 of the region A2 and the region B2 (right part of the body), the average temperature s1 of the region A1 (left part of the head), and the average temperature s2 of the region A2 (right part of the head) are calculated. Thereafter, from the above relational expressions (1), (2) and (3), the reference background average BT, reference body average MT and reference skin average ST at an ambient temperature T are obtained. The preset allowable temperature width of the preset background average is represented by kb, the preset allowable temperature width of the body average by km and the preset allowable temperature width of the skin average by ks.

If $|BT-b1| \leq kb$ and $|BT-b2| > kb$, it can be judged that the region C1 (the temperature of right part of the background of the driver) is in a steady state but the region C2 (the temperature of right part of the background of the driver) is in an unsteady state.

If $|MT-m1| \leq km$ and $|MT-m2| > km$, it can be said that the region A1 and the region B1 (left half of the body of the driver) are in a steady state but the region A2 and the region B2 (right half of the body of the driver) are in an unsteady state.

Further, if $|ST-S1| \leq ks$ and $|ST-m2| \leq ks$, it can be judged that both the region A1 (left part of the face of the driver) and the region A2 (right part of the face of the driver) are in a steady state.

If b2>BT and m2>MT, as the temperature of a right half part of the body of the driver and the temperature of a right part of the background are higher than those in a steady state and the face of the driver is in a steady state, it can be estimated that hot air from the air output port is blown against a lower right part of the body of driver.

Thus, in this embodiment of the present invention, the matrix elements of the thermal image are divided into a plurality of background regions, a plurality of body regions and a plurality of skin regions, and the differences between the average values of temperature data of these regions and the reference background average, reference body average and reference skin average at an ambient temperature are compared with predetermined reference values, respectively, to judge the current state of the thermal image and specify a region(s) in an unsteady state. Therefore, the quick and accurate control of the air conditioner is possible.

In this embodiment, when the differences between the measurement temperatures of objects such as b1 and m2 and the temperatures of the objects such as BT and MT obtained by inserting an ambient temperature at the time of measurement into the above relational expressions exceed predetermined values such as kb and km, an unsteady state is determined. However, when the difference between the ratio (MT/BT) of the reference background average to the reference body average and the ratio (m1/b1) of the background average to the body average which are measurement values exceeds a predetermined allowable value x, it can be judged whether the thermal image is in a steady state or an unsteady state. That is, if the background average b1 is in a steady state ($|BT-b1| \leq kb$) and $|MT/BT-m1/b1| > x$, it is understood that the region C1 (the temperature of a left part of the background of the driver) is in a steady state but region A1+region A2 (left half part of the body of the driver) are in an unsteady state. As described above, since the higher the ambient temperature the smaller the temperature difference between regions of the thermal image becomes, judgment accuracy at a high ambient temperature can be raised by comparing the ratio of the temperatures of regions with the ratio of the reference temperatures of regions.

In this embodiment, the background region, body region and skin region of the thermal image are each divided into two. It is needless to say that the finer control of the air conditioner is made possible by increasing the number of divisions. While the regions of the thermal image consist of background region, body region and skin region in this embodiment, the regions may consist of background region, clothes region and skin region.

Embodiment 3

A thermal image at the time of heating operation obtained by the temperature distribution measuring unit 1 is divided into three regions as shown in FIG. 1: head region (A=A1+A2), clothes region (B=B1+B2) and background region including the seat (C=C1+C2). The average temperature "bt" of the region C, the average temperature "mt" of the region A and the region B and the average temperature "st" of the region A are calculated. Thereafter, the values of "bt", "mt" and "st" are inserted into BT, MT and ST of the above relational expressions (1), (2) and (3) to obtain ambient temperatures T(b), T(m) and T(s), respectively. The preset allowable temperature width of the background average is represented by kb, the preset allowable temperature width of the body average by km and the preset allowable temperature width of the skin average by Ks.

If $|T(b)-T| \leq kb$, $|T(m)-T(b)| \leq km$, $|T(S)-T(b)| > ks$, it can be judged that the body temperature of the driver is in a steady state but the skin temperature of the driver is in an unsteady state. (If |T(b)−T|>km, it can be judged that the background temperature and the body temperature of the driver are in an unsteady state and the skin temperature of the driver is in a steady state.) If T(s)<T(b), the body temperature of the driver is in a steady state but the face of the driver is not warmed yet. Therefore, it can be estimated that hot water from the air outlet port is blown against a lower right part of the body of the driver.

Thus, in this embodiment, ambient temperatures are obtained from the background average, body average and skin average of the measured thermal image and the differences among the ambient temperatures are compared with predetermined allowable values to judge the current state of the thermal image. Further, the difference of state between objects of the thermal image can be obtained, thereby making possible accurate control of the air conditioner.

While the state of the inside of the vehicle is judged based on ambient temperature T(s) obtained from the background average in this embodiment, ambient temperature T(m) obtained from the body average or ambient temperature T(s) obtained from the skin average may be used as a reference.

Embodiment 4

Figure 4:
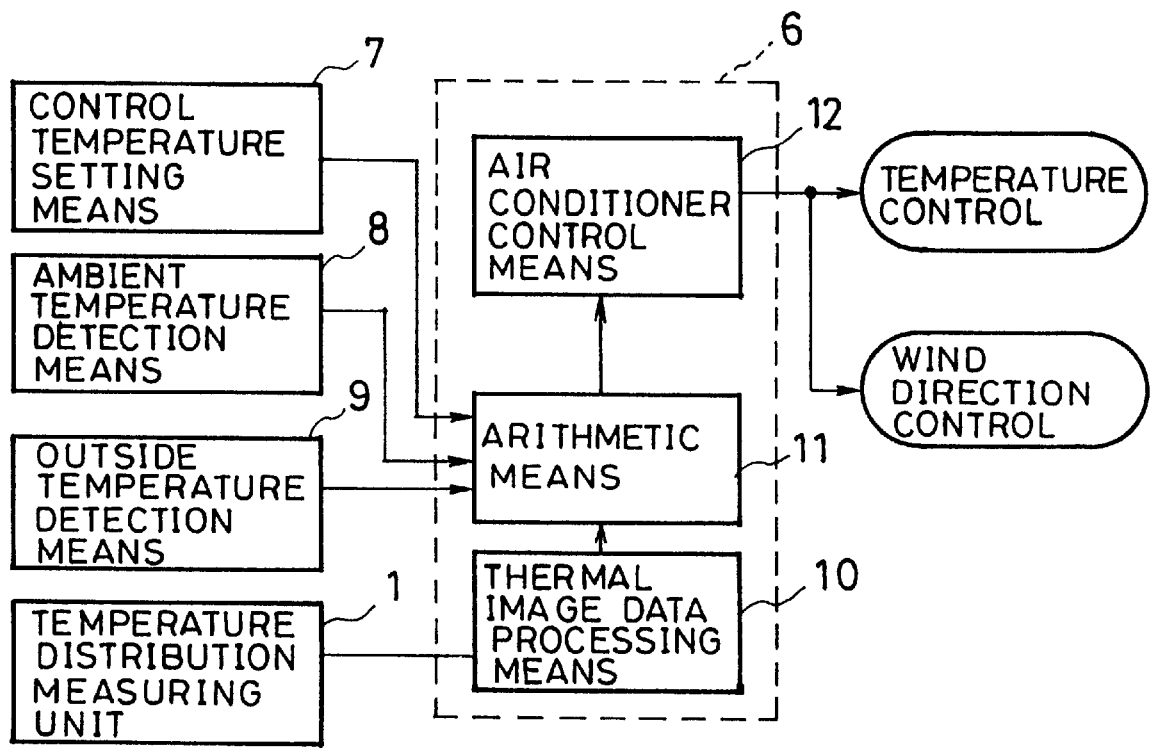
FIG. 4 is a block diagram of a control system of an air conditioner according to a fourth embodiment of the present invention.

FIG. 4 is a block diagram of a control system of an air conditioner according to a fourth embodiment of the present invention. The control arithmetic unit 6 of the air conditioner is connected to control temperature setting means 7 for setting a temperature inside a vehicle, atmosphere detection means 8 for detecting a temperature inside the vehicle, outside temperature detection means 9 for detecting a temperature outside the vehicle, and a temperature distribution measuring unit 1 for measuring a temperature distribution in the vehicle. The control arithmetic unit 6 comprises thermal image data processing means 10 for processing temperature data on a thermal image output from the temperature distribution measuring unit 1, arithmetic means 11 for calculating temperature data such as set temperature and ambient temperature and temperature difference data supplied from the thermal image data processing means 10 and air conditioner control means 12 for controlling the temperature and blow-off direction of air blown from the air conditioner based on the result of the arithmetic unit 11.

Figure 5:
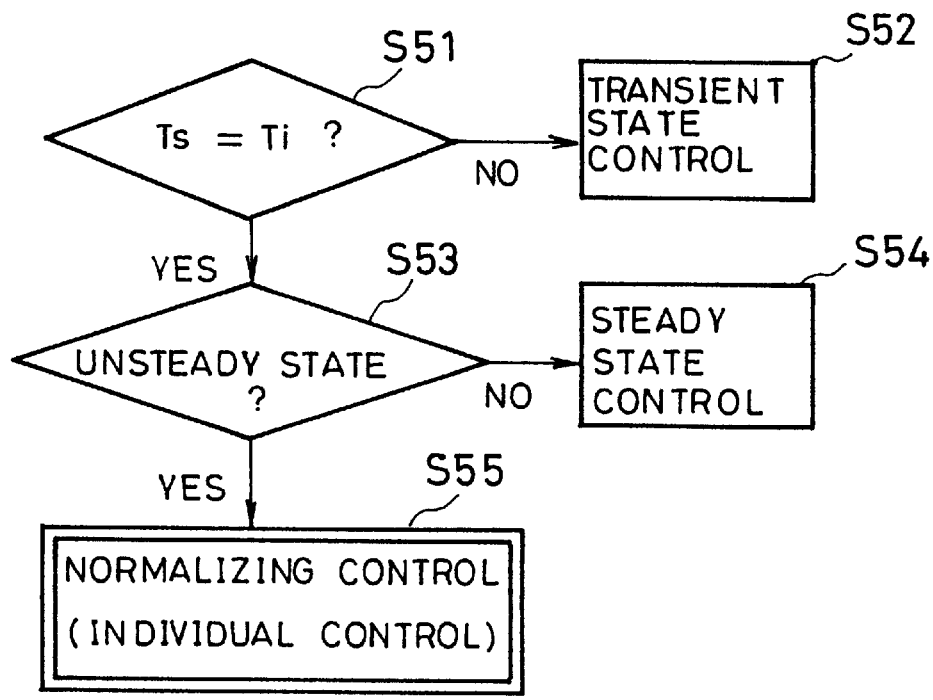
FIG. 5 is a control flow chart of the air conditioner according to the fourth embodiment of the present invention.
Figure 6:
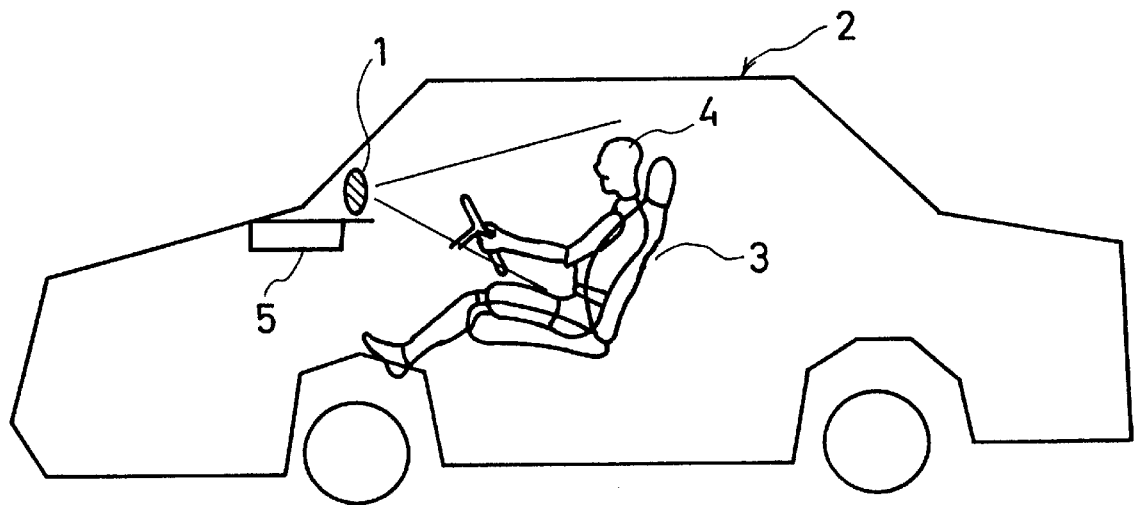
FIG. 6 is diagram for explaining the arrangement of an apparatus for measuring a temperature distribution for use in a car air conditioner of the prior art.
Figure 7:
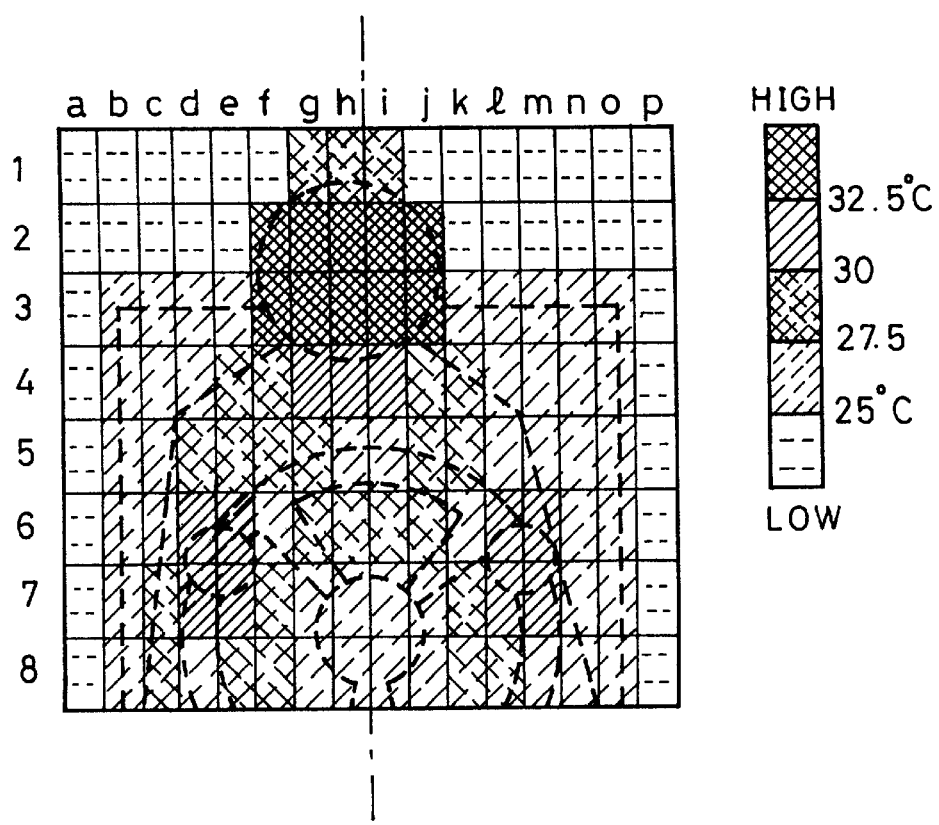
FIG.7 shows an example of a thermal image measured by the apparatus for measuring a temperature distribution of the prior art.

A description is subsequently given of the operation of the control system with reference to the flow chart of FIG. 5.

Firstly, a temperature Ti inside the vehicle detected by the atmosphere detection means 8 and a temperature TS set by the control temperature setting means 7 are compared with each other (step S51). When Ti is different from Ts, transient state control is carried out (step S52). This transition state control is such that the temperature and blow-off quantity of air supplied from the air conditioner are controlled based on the difference between the above set temperature Ts and the outside temperature Ta detected by the outside temperature detection means 9 at the time of cooling operation, for example. When Ti is equal to Ts, it is judged whether the state inside the vehicle is steady or unsteady (step S53). This judgment is carried out in accordance with the method described in the section of Embodiment 2, for example, by the thermal image data processing means 10 for processing temperature data on a thermal image output from the temperature distribution measuring unit 1. As a result, when the inside of the vehicle is in a steady state, steady state control for keeping the current control of the temperature and blow-off quantity of air supplied from the air conditioner is carried out (step S54). When the inside of the vehicle is in an unsteady state, normalizing control for controlling the temperature and blow-off quantity of air supplied from the air conditioner is carried out so that a specified unsteady region is brought into a steady state as the unsteady region inside the vehicle can be specified as described above (step S56).

Thus, in this embodiment, by judging the state of the inside of the vehicle from the state of a thermal image measured by the temperature distribution measuring unit 1, control for bringing a region in an unsteady state inside the vehicle into a steady state can be carried out.

As described above, in the method of judging a thermal image according to the first aspect of the present invention, since whether the thermal image is in a steady state or an unsteady state is judged based on the measurement values of the temperatures of objects and ambient temperature and previously obtained relational expressions between ambient temperature and the temperatures of the objects, the state of the inside of the vehicle can be judged with a single measurement of the thermal image without calculating time averages of thermal data. Therefore, quick control of the air conditioner is possible.

In the method of judging a thermal image according to the second aspect of the present invention, since the above objects to be measured are each divided into a plurality of regions and whether the thermal image is in a steady state or an unsteady state is judged based on the measurement values of the temperatures of the divided objects and ambient temperature and previously obtained relational expressions between ambient temperature and the temperatures of the objects, a region(s) in an unsteady state can be specified. Therefore, the appropriate control of the air conditioner is possible.

In the method of judging a thermal image according to the third aspect of the present invention, since an unsteady state is determined when the difference between the measurement temperature of an object and the temperature of the object obtained by inserting an ambient temperature at the time of measurement into the above relational expression exceeds a predetermined value, accurate control of the air conditioner is possible.

In the method of judging a thermal image according to the fourth aspect of the present invention, since an unsteady state is determined when the difference between the ratio of the measurement temperatures of objects and the ratio of the temperatures of the objects obtained by inserting an ambient temperature at the time of measurement into the above relational expressions exceeds a predetermined value, the accurate control of the air conditioner is possible even when the ambient temperature is high.

In the method of judging a thermal image according to the fifth aspect of the present invention, since the difference between ambient temperatures obtained by inserting the measurement temperatures of objects into the above relational expressions is obtained and an unsteady state is determined when the above temperature difference exceeds a predetermined value, the difference between the state of an object and the state of another object of the thermal image is known. Therefore, the accurate control of the air conditioner is possible.

In the method of controlling an air conditioner according to the sixth aspect of the present invention, objects to be measured of a thermal image measured by infrared sensors are each divided into a plurality of regions, and using the measurement values of the temperatures of the divided objects and ambient temperature and previously obtained relational expressions between ambient temperature and the temperatures of the objects, it is judged that the thermal image is not in a steady state with small variations in the temperatures of the objects but in an unsteady state in transit to a steady state when the difference between the measurement temperature of an object and the temperature of the object obtained by inserting an ambient temperature at the time of measurement into the above relational expression exceeds an predetermined values, or when the difference between the ratio of the measurement temperatures of objects and the ratio of the temperatures of the objects obtained by inserting an ambient temperature at the time of measurement into the above relational expressions exceeds a predetermined value, or when the difference between ambient temperatures obtained by inserting the measurement temperatures of objects into the above relational expressions exceeds a predetermined value, and the set temperature of the air conditioner and the angle of the air outlet port are controlled so that a region(s) in an unsteady state inside the vehicle is(are) brought into a steady state based on the result of the above judgment, control for quickly bringing the region(s) in an unsteady state inside the vehicle into a steady state is possible.

What is claimed is:

1. A method of judging whether a thermal image measured by infrared sensors is in a steady state with small variations in the temperatures of objects or an unsteady state in transit to a steady state, wherein whether the thermal image is in a steady state or an unsteady state is judged based on measurement values of temperatures of objects and ambient temperature and previously obtained relational expressions between ambient temperature and the temperatures of the objects.

2. A method of judging a thermal image according to claim 1, wherein the objects to be measured are each divided into a plurality of regions and whether the thermal image is in a steady state or an unsteady state is judged based on measurement values of temperatures of the divided objects and ambient temperature and previously obtained relational expressions between ambient temperature and the temperatures of the objects.

3. A method of judging a thermal image according to claim 1, wherein an unsteady state is determined when a difference between a measurement temperature of an object and a temperature of the object obtained by inserting an ambient temperature at the time of measurement into a relational expression exceeds a predetermined value.

4. A method of judging a thermal image according to claim 1, wherein an unsteady state is determined when a difference between a ratio of measurement temperatures of objects and a ratio of temperatures of the objects obtained by inserting an ambient temperature at the time of measurement into relational expressions exceeds a predetermined value.

5. A method of judging a thermal image according to claim 1, wherein an unsteady state is determined when a difference between ambient temperatures obtained by inserting measurement temperatures of objects into relational expressions exceeds a predetermined value.

6. A method of controlling an air conditioner characterized in that objects to be measured of the thermal image measured by infrared sensors are each divided into a plurality of regions, and using measurement values of temperatures of the divided objects and ambient temperature and previously obtained relational expressions between ambient temperature and the temperatures of the objects, it is judged that the thermal image is not in a steady state with small variations in the temperatures of the objects but in an unsteady state in transit to a steady state when a difference between a measurement temperature of an object and a temperature of the object obtained by inserting an ambient temperature at the time of measurement into an relational expression exceeds a predetermined value, or when a difference between a ratio of measurement temperatures of objects and a ratio of temperatures of the objects obtained by inserting an ambient temperature at the time of measurement into relational expressions exceeds a predetermined value, or when a difference between ambient temperatures obtained by inserting measurement temperatures of objects into relational expressions exceeds a predetermined value.

* * * * *